(12) United States Patent
Depondt

(10) Patent No.: US 11,299,130 B2
(45) Date of Patent: Apr. 12, 2022

(54) WINDSCREEN WIPER APPARATUS

(71) Applicant: Robert Bosch GmbH, Stuttgart (DE)

(72) Inventor: Helmut Depondt, Boutersem (BE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/993,418

(22) Filed: Aug. 14, 2020

(65) Prior Publication Data

US 2021/0046904 A1    Feb. 18, 2021

(30) Foreign Application Priority Data

Aug. 15, 2019 (DE) ..................... 10 2019 212 235.3

(51) Int. Cl.
| | | |
|---|---|---|
| *B60S 1/38* | (2006.01) | |
| *B60S 1/40* | (2006.01) | |
| *B60S 1/52* | (2006.01) | |

(52) U.S. Cl.
CPC ........... *B60S 1/3805* (2013.01); *B60S 1/3849* (2013.01); *B60S 1/3862* (2013.01); *B60S 1/40* (2013.01); *B60S 1/4087* (2013.01); *B60S 1/524* (2013.01)

(58) Field of Classification Search
CPC .... B60S 1/3805; B60S 1/3803; B60S 1/3849; B60S 1/3851; B60S 1/40; B60S 1/4003; B60S 1/3862; B60S 1/524; B60S 1/522; B60S 1/4087; B60S 1/3415
USPC ........... 15/250.05–250.09, 250.32, 250.361, 15/250.43, 250.44, 250.351
See application file for complete search history.

(56) References Cited

U.S. PATENT DOCUMENTS

| | | | | |
|---|---|---|---|---|
| 3,419,932 | A * | 1/1969 | Linker | B60S 1/08 |
| | | | | 15/250.06 |
| 3,461,477 | A * | 8/1969 | Ikner | B60S 1/3805 |
| | | | | 15/250.06 |
| 3,587,129 | A * | 6/1971 | Linker | B60S 1/3805 |
| | | | | 15/250.06 |
| 5,325,561 | A * | 7/1994 | Kotlar | B60S 1/3805 |
| | | | | 15/250.05 |
| 9,452,736 | B2 * | 9/2016 | Egner-Walter | B60S 1/3805 |
| 9,714,007 | B2 * | 7/2017 | Schaeuble | B60S 1/524 |
| 2014/0196240 | A1 * | 7/2014 | Grasso | B60S 1/524 |
| | | | | 15/250.04 |
| 2014/0331435 | A1 * | 11/2014 | Izabel | B60S 1/3862 |
| | | | | 15/250.32 |

FOREIGN PATENT DOCUMENTS

| | | | |
|---|---|---|---|
| EP | 2272727 | * | 1/2011 |
| JP | 10-329655 | * | 12/1998 |

* cited by examiner

*Primary Examiner* — Gary K. Graham
(74) *Attorney, Agent, or Firm* — Michael Best & Friedrich LLP

(57) ABSTRACT

A windscreen wiper apparatus (10) having at least one wiper blade (14), having at least one heating element (16, 16') that is arranged on the wiper blade (14), in particular is integrated into the wiper blade (14), having at least one wiper blade adapter (18), and having at least one wiper arm adapter (50) that may be connected to the wiper blade adapter (18) along a longitudinal axis (24) of the wiper blade adapter (18).

12 Claims, 2 Drawing Sheets

WINDSCREEN WIPER APPARATUS

BACKGROUND OF THE INVENTION

A windscreen wiper apparatus has already been proposed having at least one wiper blade, having at least one heating element that is arranged on the wiper blade, in particular integrated into the wiper blade, and having at least one wiper blade adapter, and having at least one wiper arm adapter that may be connected along a longitudinal axis of the wiper blade adapter to the wiper blade adapter.

SUMMARY OF THE INVENTION

The invention is based on a windscreen wiper apparatus having at least one wiper blade, having at least one heating element that is arranged on the wiper blade, in particular integrated into the wiper blade, and having at least one wiper blade adapter, and having at least one wiper arm adapter that may be connected along a longitudinal axis of the wiper blade adapter to the wiper blade adapter.

It is proposed that the windscreen wiper apparatus comprises at least one electrical connecting unit that is arranged at least in part on the wiper arm adapter and in part on the wiper blade adapter and that may be connected to or disconnected from the at least one heating element by way of a translatory movement of the wiper blade adapter relative to the wiper arm adapter along or parallel to the longitudinal axis of the wiper blade adapter, wherein the at least one wiper blade adapter has at least one electrical interface element that forms an electrical connecting element of the at least one electrical connecting unit and that is connected to the wiper blade in such a manner that said electrical interface element is unable to move with respect to the at least one heating element.

It is preferred that the term "windscreen wiper apparatus" is to be understood at least as one part, preferably a sub-assembly, of a windscreen wiper. It is preferred that the windscreen wiper apparatus may also comprise the entire windscreen wiper. It is preferred that the windscreen wiper apparatus is provided for use on a vehicle. It is preferred that the windscreen wiper apparatus is provided for cleaning a surface, preferably a windscreen on a vehicle. It is preferred that the windscreen wiper apparatus is coupled to a vehicle, preferably to a wiper arm of a vehicle so as to clean a vehicle windscreen. It is preferred that the term "provided" is to be understood to mean especially embodied, especially designed and/or especially configured. The expression that "an object is to be provided for a specific function" is preferably to be understood that the object fulfills and/or performs this specific function in at least one application state and/or operational state. It is preferred that the windscreen wiper apparatus, in particular the wiper blade, has at least one wiper strip unit. It is preferred that the wiper strip unit has a wiper base body that is formed at least from an elastic material and has a wiper lip. It is preferred that the term "operational state" is to be understood to be a state in which the windscreen wiper apparatus is ready for operational use for a wiper action and/or a wiper operation and/or is located in a wiper operation in which the wiper strip unit of the windscreen wiper apparatus is preferably guided over a vehicle windscreen and in this case advantageously lies against the vehicle windscreen.

It is preferred that a heating element is an object that converts a supplied energy, in particular electrical energy, into heat and that is provided so as to discharge the heat to its surrounding area. It is preferred that the heating element is arranged on at least one spring rail of the wiper blade and/or of the at least one wiper strip unit of the wiper blade. It is preferred that the heating element is provided so as to temper the spring rail and/or the wiper strip unit. It is preferred that the at least one heating element is embodied as a heating resistor. The at least one heating element is by way of example formed from a heating wire and/or a heating film and/or an in particular conductive heating ceramic and/or an in particular conductive heating paste.

It is preferred that the at least one wiper blade adapter comprises at least one adapter base body on which are arranged in particular fluid-carrying connecting elements. It is preferred that the fluid-carrying connecting elements are material extensions of the at least one adapter base body. It is preferred that in each case the material extensions of the at least one adapter base body delimit a fluid channel. It is preferred that a fluid channel is at least one channel-like recess and/or at least one channel that is delimited by a tube-like and/or at least one pipe-like element, wherein the channel-like recess and/or the channel that is delimited by a tube-like and/or pipe-like element is provided so as to carry a fluid, preferably a cleaning fluid. It is preferred that the at least one adapter base body has at least three fluid-carrying connecting elements, in particular material extensions that delimit a fluid channel.

It is preferred that the wiper blade adapter has at least one electrical interface element as a female connector, a socket, a male connector or the like. It is preferred that the wiper blade adapter has multiple components that, in an operational state of the wiper blade adapter, are fixedly connected to one another in particular in such a manner that said wiper blade adapter is unable to move. It is preferred that the at least one electrical interface element is fixedly connected to at least one further component of the wiper blade adapter in particular in such a manner that said electrical interface element is unable to move. It is preferred that, in the operational state of the wiper blade adapter, the components of the wiper blade adapter are connected to one another in a non-detachable manner without the use of a tool, in particular using a force of less than 200 N. It is preferred that the wiper blade adapter is embodied without a bearing element that mounts a component of the wiper blade adapter in a movable, such as for example in a pivotable and/or rotatable manner, on a further component of the wiper blade adapter. It is preferred that, at least in the operational state of the wiper blade adapter, the at least one electrical interface element is connected to a component of the wiper blade adapter in such a manner that said electrical interface element is unable to move with respect to all other components of the wiper blade adapter. It is preferred that, at least in the operational state of the wiper blade adapter, the at least one electrical interface element is connected to the wiper blade in such a manner that said electrical interface element is unable to move. It is preferred that, at least in the operational state of the wiper blade adapter, the at least one wiper blade adapter is connected to the wiper blade in such a manner that said wiper blade adapter is unable to move. It is preferred that the at least one electrical interface element forms the electrical connecting element of the electrical connecting unit on the wiper blade adapter.

It is preferred that the wiper blade adapter has at least one further electrical interface element, in particular one which is embodied so as to be complementary to the at least one electrical interface element, such as a matching female connector, a matching socket, a matching male connector or the like. It is preferred that the at least one further electrical interface element forms a further electrical connecting element of the electrical connecting unit on the wiper arm adapter.

It is preferred that the wiper blade adapter, in particular the adapter base body, may be connected, in particular electrically, to the wiper arm adapter along a longitudinal axis of the wiper blade adapter, in particular of the adapter base body, preferably by means of a plug-in connection and/or by means of a latching connection. It is preferred that the electrical connecting unit may be connected or disconnected by way of a translatory movement of the further electrical connecting element on the wiper blade adapter relative to the electrical connecting element on the wiper arm adapter along or parallel to the longitudinal axis of the wiper blade adapter.

It is preferred that the further electrical connecting element on the wiper blade adapter is connected to the electrical connecting element on the wiper arm adapter in the case of the wiper arm adapter being mechanically coupled to the wiper blade adapter. It is preferred that the at least one electrical connecting unit electrically connects the heating element to an electrical energy storage device, such as a re-chargeable battery or a battery, and/or to a control unit so as to provide electrical energy as desired from the energy storage device. It is preferred that an electrical connection of the electrical energy storage device to the heating element, in particular for supplying electrical energy, may be connected or disconnected by way of a translatory movement of the electrical connecting element on the wiper blade adapter relative to the further electrical connecting element on the wiper arm adapter along or parallel to the longitudinal axis of the wiper blade adapter. It is preferred that the further electrical connecting element on the wiper arm adapter is connected to the electrical energy storage device and/or to the control unit in particular in a fixed manner via a power line, such as a cable.

It is possible by way of the embodiment in accordance with the invention of the windscreen wiper apparatus to realize an advantageously uncomplicated procedure of assembling the windscreen wiper apparatus. It is possible to realize an advantageously uncomplicated procedure of assembling an electrical connecting unit. It is possible to realize an advantageously time-saving and/or cost-saving work step during the assembly procedure. It is possible to realize an advantageously uncomplicated electrical supply of the wiper blade. It is possible to realize an advantageous simplification of the exchangeability of the wiper blade.

Moreover, it is proposed that the at least one wiper blade adapter comprises at least one, in particular the already mentioned, adapter base body and at least one covering element that is connected to the adapter base body in such a manner that said covering element is unable to move and the at least one electrical connecting element of the electrical connecting unit is arranged on said covering element. It is preferred that the at least one adapter base body and the at least one covering element may be connected to one another via a plug-in connection and/or a latching connection. It is preferred that, in an operational state of the wiper blade adapter, the at least one adapter base body and the at least one covering element are fixedly connected to one another, in particular in such a manner as they are unable to move. It is preferred that the at least one adapter base body and the at least one covering element do not have a bearing element, in particular for a moveable mounting arrangement with respect to one another. It is preferred that the adapter base body is fixedly connected, in particular in such a manner as to be unable to move, to the wiper blade, in particular to at least one spring rail, to a wind-deflecting unit and/or to a wiper strip unit. It is preferred that the at least one covering element is embodied as a holding spring. It is possible to realize an advantageously stable and/or robust multi-part wiper blade adapter.

Moreover, it is proposed that the at least one covering element guides at least one electrical line so as to supply the at least one heating element with electrical energy. It is preferred that the at least one electrical interface element is arranged on the at least one covering element. It is preferred that, in at least one operational state of the at least one wiper blade adapter, the at least one electrical interface element is arranged between the covering element and the adapter base body. It is preferred that the at least one electrical interface element is connected to the at least one covering element. It is preferred that the at least one covering element guide at least one electrical line from the at least one covering element along a longitudinal axis of the at least one covering element. It is preferred that the at least one electrical line is embodied as a cable, in particular as an insulated cable. It is preferred that the term "longitudinal axis" of an object is to be understood to be an axis that is parallel to a longest side of a smallest imaginary cuboid that only just encompasses the object completely. It is preferred that the at least one electrical line is connected at least at one site to the at least one covering element. It is possible to realize an advantageously safe electrical connection of the at least one heating element. It is possible to advantageously avoid it being necessary to arrange an electrical line manually on the wiper blade adapter. It is possible to realize an advantageously easy assembly procedure.

Moreover, it is proposed that the windscreen wiper apparatus has at least one adapter attachment so as to provide an unmovable connection to the at least one adapter base body, wherein the at least one adapter attachment has a wiper blade adapter channel and does not guide at least one electrical line so as to supply the at least one heating element with electrical energy. It is preferred that the wiper blade adapter comprises at least one electrical interface element and at least one fluid-carrying connecting element. It is preferred that the adapter base body comprises three fluid-carrying connecting elements that are separated from one another as far as the fluid is concerned. It is preferred that the at least one adapter attachment connects the at least three fluid-carrying connecting elements to one another. It is preferred that the at least one adapter attachment is provided so as to provide a plug-in connection and/or a latching connection and/or a clamping connection and/or a material-bonded connection such as by way of a welding procedure to the adapter base body. It is preferred that the at least one adapter attachment forms a hollow space which extends through at least 90% of the volume of the adapter attachment, in particular and which is provided so as to provide a fluid-carrying connection of the fluid-carrying connecting elements of the adapter base body. It is preferred that the adapter attachment is arranged at a distance from the electrical lines of the wiper blade adapter. It is preferred that, in particular in the operational state of the wiper blade adapter, the at least one adapter attachment is arranged at a distance of at least 1 mm, preferably at least 2 mm, from an electrical line, in particular an insulation of an electrical line, in particular of the electrical line on the covering element. It is preferred that the adapter attachment is arranged at a distance from the electrical interface element of the wiper blade adapter. It is preferred that, in particular in the operational state of the wiper blade adapter, the at least one adapter attachment arranged at a distance of at least 1 mm, preferably at least 2 mm, from the electrical interface element. It is possible to realize an advantageously safe separation of the fluid-carrying and electrical components, in particular lines of the wiper blade adapter.

Moreover, it is proposed that the at least one electrical interface element of the wiper blade adapter is embodied so as to provide a latching connection and/or a plug-in connection to the at least one covering element. Alternatively, it is conceivable that the at least one electrical interface element is embodied as one piece with the at least one covering element. The term "one piece" is understood to mean in particular at least connected in a material-bonded manner, by way of example by way of a welding process, an adhering process, an injection molding process and/or any other process that appears expedient to the person skilled in the art and/or advantageously formed in one piece, such as by way of example by way of a production process of casting in one piece and/or by way of a production process of injection molding one or multiple components and advantageously from an individual blank. It is preferred that the at least one electrical interface element is connected to the at least one covering element in such a manner that said electrical interface element is unable to move. It is preferred that the at least one electrical interface element is fixedly connected to the at least one electrical line on the at least one covering element. It is preferred that the at least one electrical interface element is embodied so as to provide a latching connection and/or a plug-in connection to the at least one covering element on an edge of the at least one covering element. It is preferred that, in an operational state of the wiper blade adapter, the at least one electrical interface element is at least in part at a distance from the at least one covering element, in particular at least 0.2 mm. It is possible to realize an advantageous exchangeability of the electrical connecting unit on the wiper blade adapter. It is possible to realize advantageous assembly and/or repair conditions for the electrical connecting unit.

Moreover, it is proposed that the at least one covering element delimits at least one electrical channel in which at least one electrical line is arranged. It is preferred that the term an "electrical channel" is to be understood to mean a channel that extends along a surface of a component or a channel that extends in a component and that is embodied in a groove-like, depression-like or tunnel-like manner, wherein the electrical channel is provided in a receiving facility at least of one electrical conductor. It is preferred that the electrical channel extends over at least 70% of a maximal extension of the at least one covering element along the longitudinal axis of the at least one covering element, in particular of a longitudinal axis of the at least one wiper blade adapter. It is preferred that at least one, in particular the electrical line, extends through the electrical channel. It is preferred that, in particular in an operational state of the wiper blade adapter, the at least one electrical channel terminates at a side of the covering element that is facing the wiper blade, in particular facing the heating element. It is preferred that the at least one electrical line that extends in particular along the electrical channel is connected to the heating element and to the electrical interface element. It is preferred that the at least one electrical channel has at least one recess. It is preferred that the at least one electrical channel is embodied as two material extensions that are at a distance from one another and between which the at least one electrical line is guided. Alternatively, it is conceivable that the electrical channel is embodied as a tunnel through the covering element, said tunnel being in particular at least mostly closed and having in particular at least an inlet and at least an outlet. It is possible to realize a particular advantageous separation of the electrical and fluid-carrying components of the wiper blade adapter. It is possible to realize an advantageous simplification of the procedure of assembling the windscreen wiper apparatus.

Moreover, it is proposed that the at least one electrical line is connected to the at least one covering element so as to supply the at least one wiper blade with electrical energy by way of a latching connection and/or an adhesive connection. It is preferred that the at least one electrical line is adhered, welded, fixedly clamped, in particular via latching means and/or clamping elements, to the at least one covering element. It is preferred that the at least one electrical line in particular an insulation of the at least one electrical line is plugged into, adhered to and/or clamped to the electrical channel. It is preferred that the at least one electrical line is adhered, clamped in particular fixedly latched, fixedly adhered to at least one site between the material extensions that form the electrical channel. It is possible to advantageously guide the electrical line through the wiper blade adapter.

Moreover, it is proposed that the at least one covering element does not guide a fluid-carrying line element. It is preferred that, in each state of the at least one wiper blade adapter, the at least one covering element is arranged at a distance of at least 0.5 mm, preferably at least 1 mm, from a fluid channel. It is preferred that a fluid-carrying line element is a component through which a fluid in particular a cleaning fluid flows in at least an operational state. It is preferred that the at least one covering element delimits a covering hollow space in which the at least one adapter base body is arranged at least in part in particular in the operational state of the at least one wiper blade adapter. It is preferred that, in the operational state of the wiper blade adapter, the at least one adapter attachment is arranged in the at least one covering hollow space. It is preferred that in each operational state the at least one covering element is shielded by at least one component from making contact with the fluid, in particular the cleaning fluid. It is preferred that the at least one covering element is not in contact with a component of the windscreen wiper apparatus that is carrying a fluid, in particular the cleaning fluid. It is possible to realize a procedure of assembling the wiper blade adapter that is advantageously performed in steps.

Furthermore, it is proposed that the wiper blade adapter comprises at least one, in particular the already mentioned, adapter base body, that has at least one, in particular the already mentioned, fluid-carrying interface element so as to provide a coupling to a further, in particular the already mentioned, fluid-carrying interface element arranged on the at least one wiper arm adapter and that does not guide an electrical line and that is connected to the wiper blade in such a manner that said adapter base body is unable to move with respect to the at least one heating element. It is preferred that the adapter base body does not have any connecting possibilities for an, in particular the, electrical line. It is preferred that the adapter base body is provided so as to provide a connection to the covering element to which the electrical line is connected. It is preferred that the adapter base body together with the covering element forms a mechanical interface element so as to provide a connection to a mechanical interface of the wiper arm adapter. It is preferred that the at least one adapter base body does not have any, in particular mechanical, interface elements that are provided so as to provide a connection to an electrical component, in particular an electrical line and/or an electrical interface element such as by way of example a male connector, a female connector or the like. It is possible to realize an advantageously robust wiper blade adapter base body to which it is possible to connect the adapter attachment and the covering element.

Moreover, a windscreen wiper system is proposed that comprises at least one windscreen wiper apparatus having at least one wiper arm. It is preferred that the wiper arm comprises at least one electrical supply line that is connected to the electrical storage device. It is preferred that the wiper arm comprises at least one fluid supply line that is connected to a fluid reservoir. It is possible to realize a combination of a wiper blade of a windscreen wiper apparatus having a wiper arm, said combination being advantageous for an electrical connecting unit.

The windscreen wiper apparatus and/or the windscreen wiper system in accordance with the invention is/are not to be limited in this case to the above described application and embodiment. In particular, so as to fulfill a function described herein, the windscreen wiper apparatus in accordance with the invention and/or the windscreen wiper system in accordance with the invention may have a number of individual elements, components and units that is different to the number of individual elements, components and units mentioned herein. In addition, in the case of the value ranges quoted in this disclosure, it is also possible to disclose and use as desired any values that lie within the mentioned limits.

BRIEF DESCRIPTION OF THE DRAWINGS

Further advantages are disclosed in the following description of the drawing. The drawing illustrates an exemplary embodiment of the invention. The drawing, the description and the claims disclose numerous features in combination. The person skilled in the art will also expediently consider the features individually and combine them to form expedient further combinations.

In the drawing.

DETAILED DESCRIPTION

Figure 1:
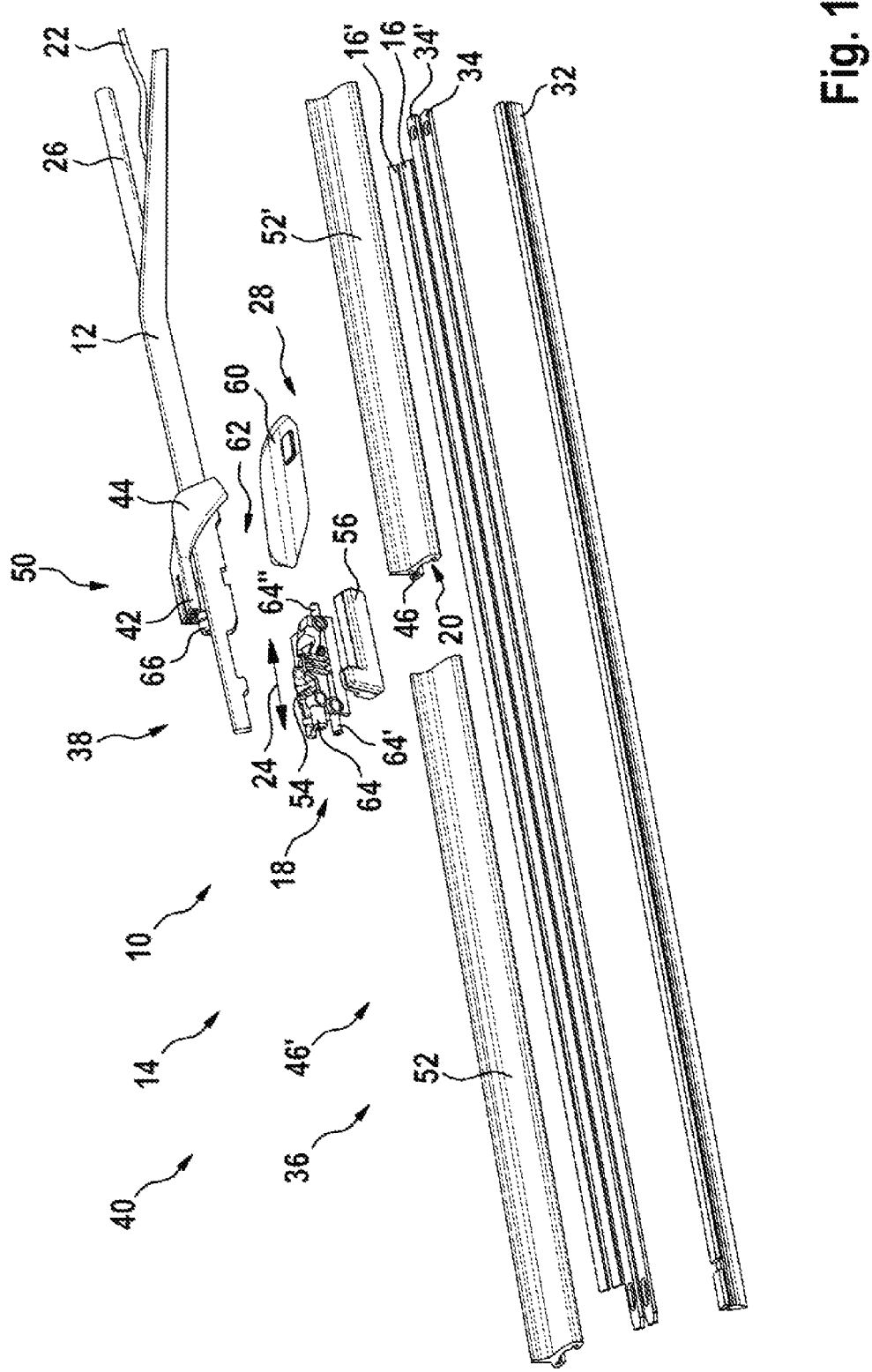
FIG. 1 shows a schematic illustration of a windscreen wiper system in accordance with the invention and FIG. 2 shows a schematic illustration of an electrical connecting unit of a windscreen wiper apparatus in accordance with the invention.

FIG. 1 illustrates a windscreen wiper system 40. The windscreen wiper system 40 comprises at least one windscreen wiper apparatus 10. The windscreen wiper system 40 comprises at least one wiper arm 12.

The windscreen wiper apparatus 10 comprises at least one wiper blade 14. The windscreen wiper apparatus 10, in particular the wiper blade 14, comprises at least one wiper blade adapter 18. The windscreen wiper apparatus 10, in particular the wiper blade 14, comprises a wiper strip unit 32. The windscreen wiper apparatus 10, in particular the wiper blade 14, comprises two spring rails 34, 34'. The windscreen wiper apparatus 10, in particular the wiper blade 14, comprises a wind-deflecting unit 36 that comprises at least two spoilers 52, 52'.

The windscreen wiper apparatus 10 comprises at least one heating element 16, 16' that is arranged on the wiper blade 14 and in particular integrated into the wiper blade 14. The windscreen wiper apparatus 10 comprises two heating elements 16, 16'. The two heating elements 16, 16' are arranged between the wind-deflecting unit 36, in particular between the spoilers 52, 52' and the spring rails 34, 34'. The two heating elements 16, 16' are integrated in part into the wind-deflecting unit 36, in particular into a spring rail receiving facility 20 of the wind-deflecting unit 36, in an operational state of the wiper blade 14. The two heating elements 16, 16' lie flat against the spring rails 34, 34' in the operational state of the wiper blade 14.

The windscreen wiper apparatus 10 comprises at least one wiper blade fluid channel 46, 46' that is arranged on the wiper blade 14, in particular is integrated into the wiper blade 14. The wiper blade fluid channel 46, 46' is integrated into the spoiler 52, 52' of the wind-deflecting unit 36.

The wiper arm 12 comprises at least one electrical supply line 22. The electrical supply line 22 is provided so as to convey power from an electrical storage device (not illustrated) to the heating element 16. The wiper arm 12 comprises at least one fluid supply line 26. The fluid supply line 26 is provided so as to convey a fluid, in particular a cleaning fluid, from a fluid reservoir (not illustrated) to a wiper blade fluid channel 46, 46'.

A mechanical interface 62 of the wiper arm adapter 50 is arranged on the wiper arm 12. The wiper arm adapter 50 comprises the mechanical interface 62 of the wiper arm 12, in particular recesses that are arranged adjacent to one another at one end of the wiper arm 12, which forms a key bit-like outer contour of the wiper arm 12. The mechanical interface 62 is formed as one piece with the wiper arm 12. The mechanical interface 62 is provided so as to provide a mechanical coupling of the wiper blade adapter 50 to the wiper blade adapter 18.

Figure 2:
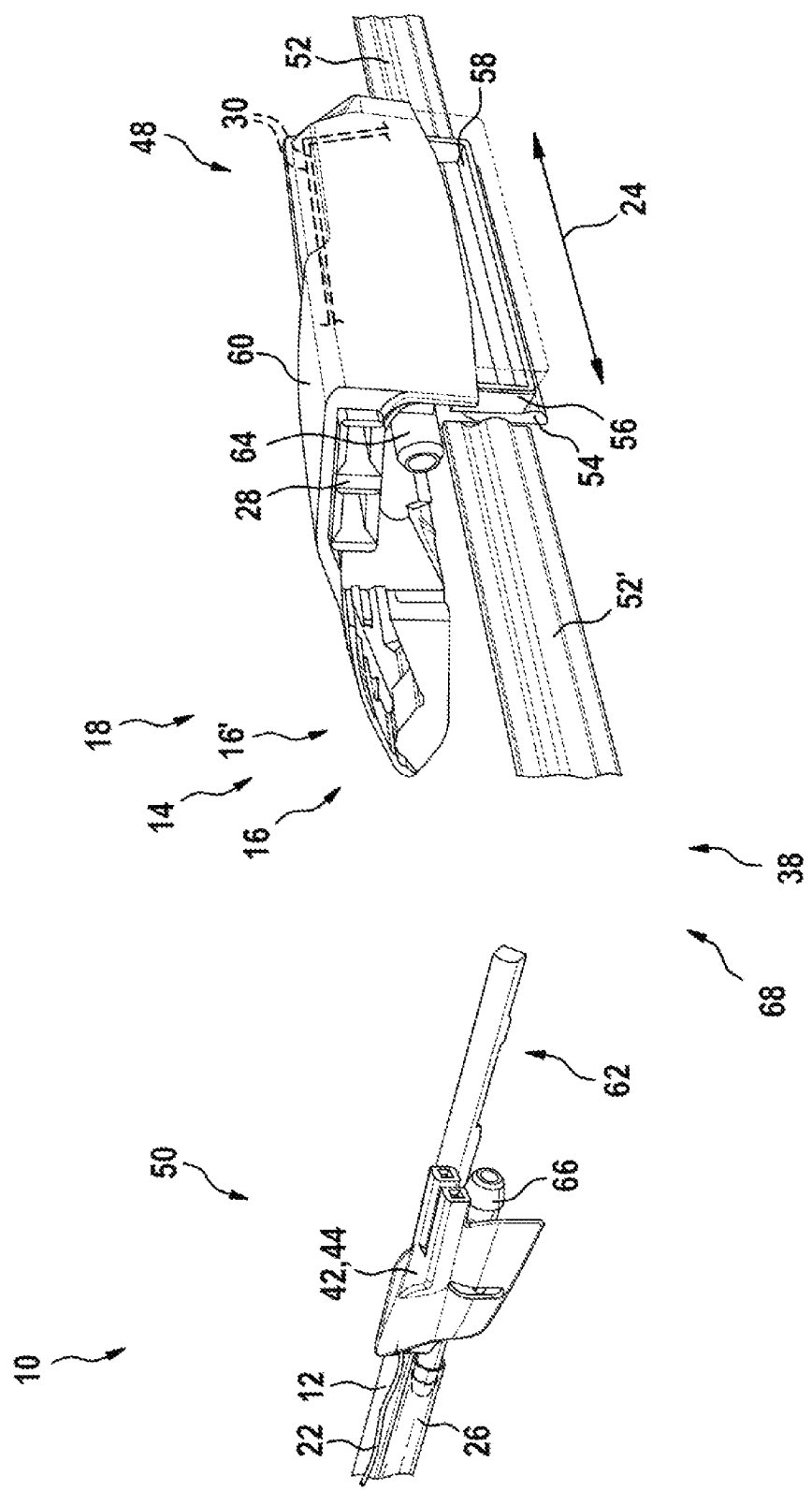

FIG. 2 illustrates that the windscreen wiper apparatus 10 comprises at least one wiper arm adapter 50. It is preferred that the wiper arm adapter 50 comprises a further fluid-carrying interface element 66. It is preferred that the wiper arm adapter 50 comprises a wiper arm adapter covering element 44, in particular one which is provided so as to cover the further fluid-carrying interface element 66 of the wiper arm adapter 50. The wiper arm adapter 50 comprises a further electrical interface element 42. The further electrical interface element 42 is electrically connected to the electrical supply line 22. The further electrical interface element 42 is formed as one piece with the wiper arm adapter covering element 44.

The further electrical interface element 42 is embodied as a dual male connector. The further electrical interface element 42 is provided so as to provide a releasable coupling, in particular a plug-in connection, to the wiper blade adapter 18, in particular an electrical interface element 28 of the wiper blade adapter 18. The wiper arm adapter covering element 44 is fixedly connected to the wiper arm 12 in particular in such a manner that said wiper arm adapter covering element is unable to move. The wiper arm adapter 50 is fixedly connected to the wiper arm 12. The further electrical interface element 42 forms a further electrical connecting element of an electrical connecting unit 38.

It is conceivable that the wiper arm adapter covering element 44 is connected in a rotatable manner to the further fluid-carrying interface element 66. It is conceivable that the wiper arm adapter covering element 44, in particular the further electrical interface element 42, allows the further fluid-carrying interface element 66 to move in a vertical manner. The further fluid-carrying interface element 66 has a base body, a first connection piece and a second connection piece. The first connection piece is connected in a fluid-carrying manner to the second connection piece via a channel guide (not further illustrated) in the base body. The first connection piece is provided so as to provide a direct coupling to the fluid supply line 26. The second connection piece is provided so as to provide a releasable coupling to the wiper blade adapter 18.

The wiper blade adapter 18 is unable to move with respect to the wiper blade 14. The wiper blade adapter 18 comprises an adapter base body 54. The wiper blade adapter 18 comprises an adapter attachment 56. The wiper blade adapter 18 comprises a covering element 60. The at least one wiper blade adapter 18 comprises at least one adapter base body 54 and at least one covering element 60, which is connected in such a manner as to be unable to move to the adapter base body 54 and on which the at least one electrical connecting element, in particular the electrical interface element 28, of the electrical connecting unit 38 is arranged.

The at least one wiper blade adapter 18 has at least one electrical interface element 28. The electrical interface element 28 is connected to the wiper blade adapter 18, in particular to the wiper blade 14 in such a manner that said electrical interface element is unable to move with respect to the at least one heating element 16, 16'. The electrical interface element 28 forms an electrical connecting element of the at least one electrical connecting unit 38. The electrical interface element 28 is connected to the covering element 60. The at least one electrical interface element 28 is embodied so as to provide a latching connection and/or plug-in connection to the at least one covering element 60.

The adapter base body 54 is at a distance of at least 1 mm from the electrical interface element 28. The adapter attachment 56 is at a distance of at least 1 mm from the electrical interface element 28. The electrical interface element 28 is connected via an electrical line 30 to the, in particular to the two, heating element(s) 16, 16'. The electrical line 30 is guided from the covering element 60. The at least one covering element 60 does not guide a fluid-carrying line element. In particular, the covering element 60 does not delimit a fluid line.

The at least one covering element 60 guides the at least one electrical line 30 so as to supply the at least one heating element 16, 16' with electrical energy. The at least one covering element 60 delimits at least one electrical channel 48 on which or in which at least one electrical line 30 is arranged. The at least one electrical channel 48 may be embodied as a completely closed cable channel. The at least one electrical channel 48 may be embodied as an at least in part open and/or completely open cable channel between two material extensions of the covering element 60.

The at least one electrical line 30 is connected to the at least one covering element 60 by way of a latching connection and/or an adhesive connection so as to supply the at least one wiper blade 14 with electrical energy. It is conceivable that the at least one electrical line 30 is fixed to or in the electrical channel 48 at least in part by way of a latching connection and/or an adhesive connection. The adapter base body 54 is at a distance of at least 1 mm from the electrical line 30. The adapter attachment 56 is at a distance of at least 1 mm from the electrical line 30.

The wiper blade adapter 18 comprises at least one adapter base body 54 that has at least one fluid-carrying interface element 64 so as to provide a coupling to a further fluid-carrying interface element 66 that is arranged on the at least one wiper arm adapter 50. The adapter base body 54 has two additional fluid-carrying interface elements 64', 64". The two additional fluid-carrying interface elements 64', 64" are provided so as to connect to the wiper blade fluid channel 46, 46' in the wind-deflecting unit.

The adapter base body 54 does not guide an electrical line. The adapter base body 54 is connected to the wiper blade 14, in particular to the spring rails 34, 34' and/order to the wind-deflecting unit 36, in such a manner that said adapter base body is unable to move with respect to the at least one heating element 16, 16'.

The windscreen wiper apparatus 10, in particular the wiper blade adapter 18, comprises at least one adapter attachment 56 so as to provide an unmovable connection to the at least one adapter base body 54. The at least one adapter attachment 56 comprises a wiper blade adapter channel 58.

The adapter attachment 56 is connected to the adapter base body 54 without guiding at least one electrical line so as to supply the at least one heating element 1b, 1b' with electrical energy. The adapter attachment 56 is connected to the adapter base body 54 in such a manner that said adapter attachment is unable to move.

The windscreen wiper apparatus 10 comprises at least one electrical connecting unit 38 that is arranged at least in part on the wiper arm adapter 50 and in part on the wiper blade adapter 18. The electrical connecting unit 38 may be connected to or disconnected from the at least one heating element 16, 16' by way of a translatory movement of the wiper blade adapter 18 relative to the wiper arm adapter 50 along or parallel to the longitudinal axis 24 of the wiper blade adapter 18.

The electrical interface element 28 forms an electrical connecting element of the fluid connecting unit 38 that is arranged on the wiper blade adapter 18. The electrical interface element 28 is embodied as a female connector. The electrical interface element 28 is embodied as a female connector that is complementary to the further electrical interface element 66 of the wiper arm adapter 50.

The electrical line 30 that is guided through the covering element 60 forms an electrical connecting element of the electrical connecting unit 38. The at least one heating element 16, 16' may be connected to and/or disconnected from an electrical storage device by way of the electrical line 30, the electrical interface element 28 and the further electrical interface element 42. The electrical line 30, the electrical interface element 28 and the further electrical interface element 42 form the electrical connecting unit 38, in particular to the electrical supply line 22.

The electrical connecting unit 38 may be connected to or disconnected from the at least one heating element 16, 16' by way of a translatory movement of the wiper blade adapter 18 relative to the wiper arm adapter 50 along or parallel to the longitudinal axis 24 of the wiper blade adapter 18, wherein in particular the further electrical interface element 42 on the wiper arm adapter 50 forms an in particular releasable plug-in connection with the electrical interface element 28 on the wiper blade adapter 18.

The windscreen wiper apparatus 10 comprises in addition at least one fluid-carrying connecting unit 68 that is arranged at least in part on the wiper arm adapter 50 and in part on the wiper blade adapter 18. The fluid-carrying connecting unit 68 connects a fluid reservoir (not illustrated) to a wiper blade fluid channel 46, 46' that is integrated into the wind-deflecting unit 36. The fluid-carrying connecting unit 68 connects a fluid reservoir (not illustrated) to a wiper blade fluid channel 46, 46' by way of a translatory movement of the wiper blade adapter 18 with respect to the wiper arm adapter 50, in particular in an operational state of the wiper blade adapter 18. The fluid connecting unit 68 may be connected to or disconnected from the at least one heating element 16, 16' by way of a translatory movement of the wiper blade adapter 18 relative to the wiper arm adapter 50 along or parallel to the longitudinal axis 24 of the wiper blade adapter 18.

The wiper arm adapter 50 may be connected to the wiper blade adapter 18, in particular in a mechanical manner and/or in a fluid-carrying manner and in an electrical manner along a longitudinal axis 24 of the wiper blade adapter 18. It is conceivable that the fluid-carrying connection and the mechanical connection and the electrical connection may be produced or disconnected simultaneously.

It is conceivable that the wiper blade adapter 18 is positioned by way of being displaced on the at least one spring rail 34, 34'. It is conceivable that the wiper blade adapter 18 and/or the wind-deflecting unit 36 is fixedly clamped or welded to the at least one spring rail 34, 34'. It is conceivable that the wind-deflecting unit 36 is plugged onto material extensions of the wiper blade adapter 18, in particular material extensions that have fluid outlets. It is conceivable that the adapter attachment 56 is fixedly clamped or welded to the adapter base body 54.

It is conceivable that the wiper blade 14, in particular the wind-deflecting unit 36, is equipped with means so as to spray onto a windscreen and/or to electrically heat the wiper blade 14. It is conceivable that the covering element 60 is equipped with means so as to conduct electricity from the wiper arm 12 to the wiper blade 14. It is conceivable that the wiper blade adapter 18 is equipped with means so as to create a water-carrying connection from the wiper arm 12 to the wiper blade 14.

It is conceivable that the wiper arm adapter 50 has two coupling elements. A first coupling element, in particular the further electrical interface element 42, of the wiper arm adapter 50 is provided so as to provide an electrical connection. A second coupling element, in particular the further fluid-carrying interface element 66, of the wiper arm adapter 50 is provided so as to provide a water-carrying connection.

The two coupling elements, in particular the further fluid-carrying interface element 66 and the further electrical interface element 42, are connected to one another. The further electrical interface element 42 is fixedly connected to the wiper arm 12, in particular by way of a plug-in connection and/or a latching connection and/or an adhesive connection and/or a welding connection. The further fluid-carrying interface element 66 is connected in such a manner as to be able to move to the further electrical interface element 66, in particular via a groove and may transfer water from the wiper arm 12 to the wiper blade 14. The further electrical interface element 42 may follow a rotational movement of the wiper arm 12. The further fluid-carrying interface element 66 may not follow a rotational movement of the wiper arm 12.

The invention claimed is:

1. A windscreen wiper apparatus comprising
at least one wiper blade (14),
at least one heating element (16, 16') that is arranged on the wiper blade (14),
at least one wiper blade adapter (18),
at least one wiper arm adapter (50) configured to be connected along a longitudinal axis (24) of the wiper blade adapter (18) to the wiper blade adapter (18),
at least one electrical connecting unit (38) that is arranged at least in part on the wiper arm adapter (50) and in part on the wiper blade adapter (18) and that is configured to be connected to or disconnected from the at least one heating element (16, 16') by a translatory movement of the wiper blade adapter (18) relative to the wiper arm adapter (50) along or parallel to the longitudinal axis (24) of the wiper blade adapter (18), wherein the at least one wiper blade adapter (18) has at least one electrical interface element (28) that forms an electrical connecting element of the at least one electrical connecting unit (38) and that is connected to the wiper blade (14) in such a manner that said electrical interface element is unable to move with respect to the at least one heating element (16, 16'); and
at least one fluid-carrying interface element (64) so as to provide a coupling to a further fluid-carrying interface element (66) arranged on the at least one wiper arm adapter (50);
wherein the at least one wiper blade adapter (18) comprises at least one adapter base body (54) and at least one covering element (60) that is connected to the adapter base body (54) in such a manner that said covering element is unable to move and the at least one electrical connecting element of the electrical connecting unit (38) is arranged on said covering element, wherein the at least one covering element (60) guides at least one electrical line (30) so as to supply the at least one heating element (16, 16') with electrical energy, wherein the at least one covering element (60) is a separate element from the at least one fluid-carrying interface element (64), and wherein the at least one covering element (60) does not guide or delimit a fluid-carrying line element.

2. The windscreen wiper apparatus according to claim 1, further comprising at least one adapter attachment (56) so as to provide an unmovable connection to the at least one adapter base body (54), wherein the at least one adapter attachment (56) has a wiper blade adapter channel (58) and is connected to the adapter base body (54) without guiding at least one electrical line so as to supply the at least one heating element (16, 16') with electrical energy.

3. The windscreen wiper apparatus according to claim 1, characterized in that the at least one electrical interface element (28) is configured to provide a latching connection and/or a plug-in connection to the at least one covering element (60).

4. The windscreen wiper apparatus according to claim 1, characterized in that the at least one covering element (60) delimits at least one electrical channel (48) in which the electrical line (30) is arranged.

5. The windscreen wiper apparatus according to claim 1, characterized in that the at least one electrical line (30) is connected to the at least one covering element (60) so as to supply the at least one wiper blade (14) with electrical energy by way of a latching connection and/or an adhesive connection.

6. The windscreen wiper apparatus according to claim 1, characterized in that the wiper blade adapter (18) comprises at least one adapter base body (54) that has the at least one fluid-carrying interface element (64) wherein the adapter base body (54) does not guide an electrical line and is connected to the wiper blade (14) in such a manner that said adapter base body is unable to move with respect to the at least one heating element (16, 16').

7. The windscreen wiper apparatus according to claim 1, wherein the at least one heating element (16, 16') is integrated into the wiper blade (14).

8. A windscreen wiper system having at least one windscreen wiper apparatus (10) according to claim 1 and having at least one wiper arm (12).

9. The windscreen wiper system of claim 1, wherein the at least one covering element (60) has a profile that defines an area to receive the at least one fluid-carrying interface element (64).

10. The windscreen wiper system of claim 9, wherein the profile is a generally U-shaped profile.

11. The windscreen wiper system of claim 1, wherein the at least one covering element (60) is coupled to the adapter base body (54) by a latching connection.

12. The windscreen wiper system of claim 1, wherein the at least one covering element (60) is coupled to the adapter base body (54) by a plug-in connection.

\* \* \* \* \*